INVENTOR.
LOUIS BATHELLIER
BY
Bauer and Seymour
ATTORNEYS

INVENTOR
LOUIS BATHELLIER

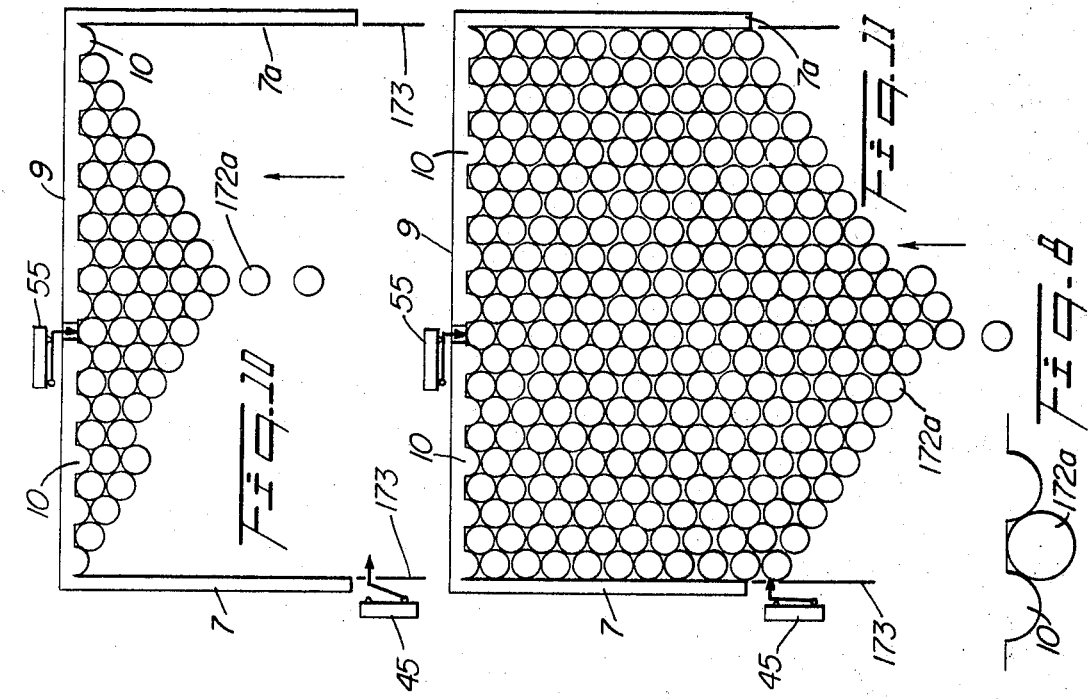
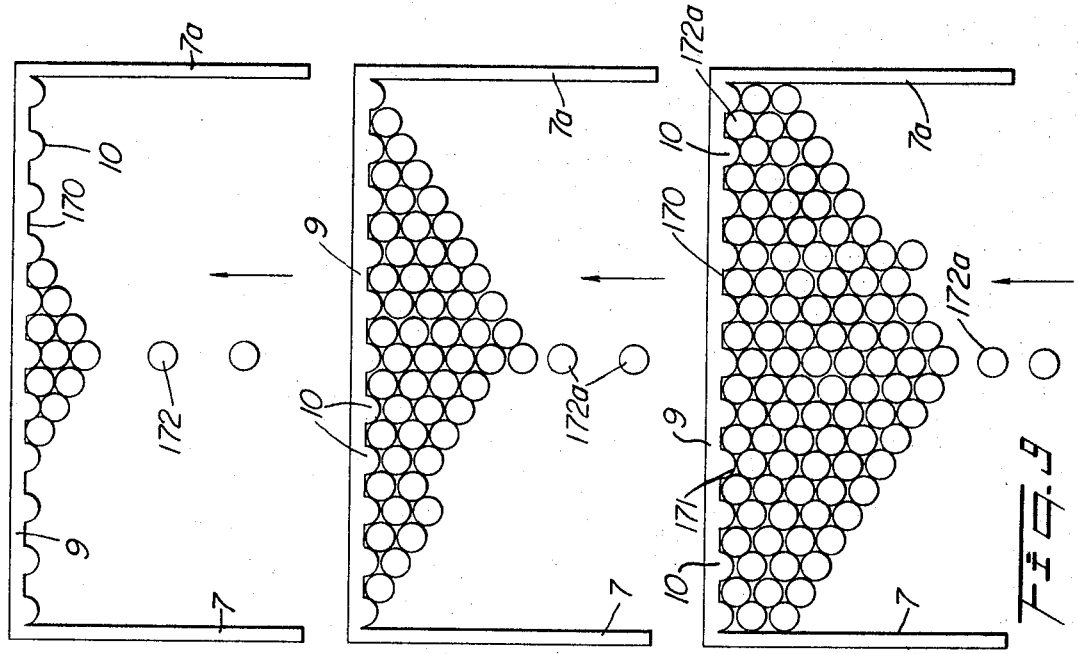

United States Patent Office 3,431,698
Patented Mar. 11, 1969

3,431,698
ARTICLE HANDLING MACHINE
Louis Bathellier, Orleans, France, assignor to Compagnie de Saint-Gobain, Neuilly-sur-Seine, France
Filed Feb. 11, 1966, Ser. No. 526,843
Claims priority, application France, Feb. 17, 1965, 5,963
U.S. Cl. 53—61      4 Claims
Int. Cl. B65b 57/10, 35/38, 43/42

ABSTRACT OF THE DISCLOSURE

Apparatus for automatically accumulating a predetermined number of containers such as bottles or cans, arranged in regular contacting quincunx relation and collectively defining a rectangle of side-by-side longitudinal files and transverse rows. Accumulation is effected by advancing the containers in single file, on and along a conveyor, arresting the motion of the initial ones of the containers by contact with a fixed bar extending transversely over and across the conveyor to form a transverse row filling the space between two laterally spaced parallel guide bars extending rearwardly from the respective ends of the transverse bar. In response to completion of accumulation of the final transverse row of the rectangle, the accumulated containers forming the rectangle are picked up as a unit by a suction head, conveyed to a position over a packing carton, lowered into the carton and there released. The cycle is repeated so that successive layers are deposited until the carton is filled.

---

This invention relates to a method and apparatus for automatically packaging a large number of manufactured articles in side-by-side relation within a container or carton, rapidly, efficiently, and at low cost per unit article.

The invention has for its principal object the provision of a method and apparatus by which a large number of articles to be packaged in a single container, are successively formed or collected into groups wherein the articles have a predetermined regular geometrical relation or arrangement, side by side, and the groups are successively emplaced, each as a unit, within a carton, packing case, box, or other enclosure, in superposed layers.

A secondary object is to provide an apparatus of the type mentioned, wherein interlayers of paperboard or like materials, are automatically deposited over and upon the tops of each layer of containers, simultaneously with the collection and assemblage of the next successive layer.

Other objects and advantages will become clear to those skilled in the art, after a study of the following detailed description.

According to the invention the procedure consists essentially (a) in positioning the articles upon a movable support which in cooperation with fixed guide means having a form or outline corresponding to that of the packing case or box, and located above the moving support a small distance, effects arrangement of the articles into the desired orderly side-by-side contacting group; (b) in raising the group as a unit by suitable means; and (c) in placing the group as a unit within the carton. Several groups may be thus emplaced in successive superposed layers until the carton is filled to the desired depth, or to its top.

I have discovered that objects or articles thus conveyed by a movable support wherein some of them are immobilized by direct contact with fixed guide means and others are immobilized with their side walls in direct contact with those in engagement with the guide means, are, without further intervention, arranged side-by-side, without being upset, and in a regular arrangement which enables them to be gripped by an apparatus for movement into a carton. Thus, for example, where the articles are bottles or flasks, their filling orifices are regularly disposed in accordance with a predetermined desired arrangement.

I have also discovered that it is desirable to adopt an arrangement of the articles in quincunx, in order to facilitate their movement along the guide means and, preferably, against an abutment disposed transversely of the direction of movement of the support or conveyor, so that the necks or filling openings of the containers in contact therewith, form a first row or line. These are so disposed and arranged that each of the articles or bottles of each succeeding row necessarily fits between a contiguous pair of objects of the next preceding row, thus creating a quincunx formation or disposition of objects.

As a non-limiting example of the method and apparatus, there is disclosed a form of the invention for use in packaging small glass bottles or flasks of a type intended to contain penicillin.

In the drawing:

FIGURES 6 to 11 are diagrams illustrating the operation of the apparatus.

Figure 1:
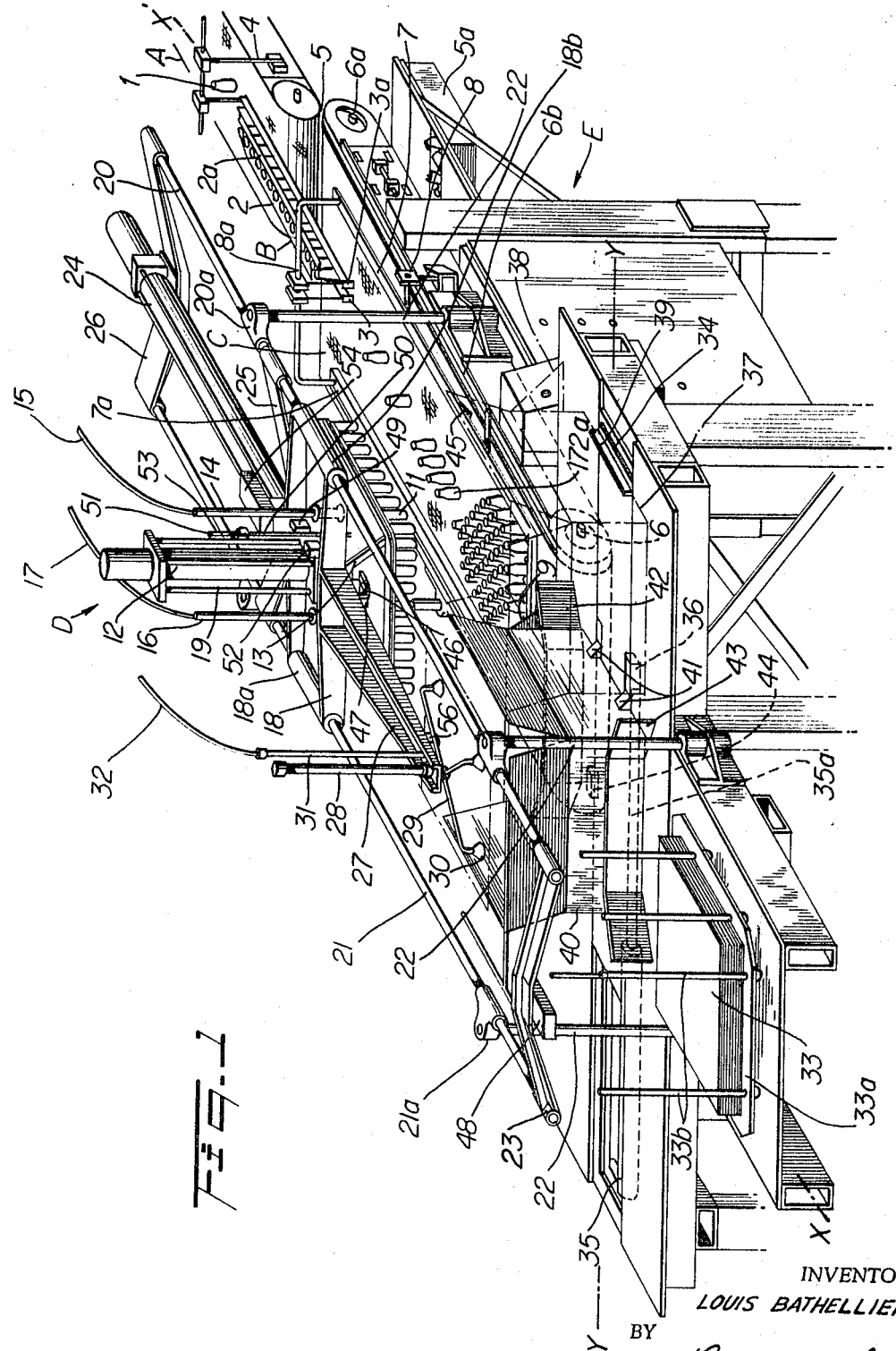
FIGURE 1 is a perspective view of the complete apparatus.

The several sections of the machine are represented upon FIGURE 1 as disposed along two mutually normally horizontal axes or directions, namely, x–x' and y–y'. Along axis x–x', starting at the right of the figure, there is shown a conveyor A of endless belt or other known type, and along which flasks or bottles are moved in single file and random spacing. By this conveyor the flasks are directed between parallel guides B, where they are aligned in single file and then transferred to an endless belt conveyor C. Mechanism generally identified at D, upper top of FIGURE 1, effects the elevation of an assemblage of flasks from conveyor C and then translates the group horizontally to a position over a packing carton. The entire device is mounted upon and supported by framework generally identified at E.

Along the axis y–y' there is disposed a platform F by which packing cartons for the flasks are directed in a predetermined path for reception of groups of flasks.

Endless belt conveyor A is of a known type and moves the flasks as they issue in single file from an annealing tunnel or leer, not shown. The flasks thus conveyed are directed by the conveyor to and between two laterally-spaced parallel, smooth guide bars 2 and 2a. These bars are located partly over conveyor A and partly over conveyor C and are so disposed and laterally spaced as to permit passage between them of the necks of the flasks so that they are guided by the rim about their mouths. The guide bars 2, 2a are positioned over and connected with small beams 3, 3a. The bridge assembly comprising bars 2, 2a, and beams 3, 3a, is adjustably suspended at one end from framework E, by means such as rods 4. The flasks are propelled along and between these bars 2, 2a, and beams 3, 3a, by the force exerted upon them by those following, as they come off conveyor A.

Those bottles or flasks deposited upon conveyor A and which for any reason are not supported by and between bars 2, 2a, and are thus defective, pass off the forward end of the conveyor and because of the discontinuity between this end of the conveyor and the adjacent end of conveyor C, drop through space 5 between ends of the conveyors, into a receptacle 5a and are thus prevented from passing to the latter conveyor.

The belt of conveyor C is faced with a smooth antifriction rubber-like surface and passes over and about two spaced rollers whose axles are identified as 6, 6a. The upper pass of this belt travels over and in contact with a flat plate 6b which is supported from framework E and extends between the two rollers, with its upper surface substantially in a plane tangent to the uppermost linear elements of the rollers. One of these rollers is driven by a motor M not shown upon FIGURE 1 but appearing schematically upon FIGURE 2.

Two guide bars 7, 7a, FIGURE 1, are supported in laterally-spaced parallel relation over and spaced above belt C. Each bar is supported by a pair of brackets spaced therealong. One such bracket is identified at 8. At their rearward ends bars 7, 7a conjointly mount a yoke 8a which, in turn, has a pair of depending rods connected therewith. The forward ends of beams 3, 3a are connected with and supported by these rods. A third or transverse abutment bar 9 is secured to and supported by the forward ends of bars 7, 7a, in position above and horizontally transverse to the direction of travel of belt C. This third bar is so disposed as to engage the oncoming flasks indicated at 172, FIGURES 1 and 6 through 11, and arrest their travel with the belt. Bars 7, 7a are supported by brackets 8, for vertical adjustment relatively to the upper pass of belt C. The height of these bars above the belt is so adjusted that the flasks do not tilt or tip. As the flasks move along belt C in single file, as depicted upon FIGURE 1, they are automatically diverted by engagement with transverse bar 9 or flasks previously accumulated, to fill the space between longitudinal guide bars 7, 7a. The separation between these bars is adjusted and fixed to correspond to the carton or box into which the group is to be packed and, of course, is so correlated with the cross-sectional size of the flasks that these automatically assume the interfitting quincunx relation shown upon the figure.

Referring in detail to FIGURES 6 through 11, FIGURE 6 shows the situation wherein containers 172 passing in single file centrally of and with conveyor belt C, in the direction indicated by the arrows, have begun to accumulate against bar 9, each fitting between a pair of contiguous protuberances 10 fixed with the bar. FIGURE 7 depicts the subsequent situation wherein all spaces formed between the protuberances have been filled and containers are forming in transverse rows. In FIGURE 9 a further accumulation of transverse rows of containers has taken place. FIGURE 10 corresponds generally to FIGURE 7 but in addition shows how one of the containers forming the initial row against bar 9, closes a control switch 55. FIGURE 11 shows a second control switch 45 closed by and in response to completion of the final row of containers which, together with the rows previously accumulated, will form a layer within the carton or package. These switches are subsequently described in detail. FIGURE 8 shows to an enlarged scale how the protuberances 10 are so spaced and shaped that a container 172 fits accurately between each consecutive pair, in tangential relation therewith.

Thus, switch 45 is so positioned that its distance from bar 9 corresponds to one horizontal dimension of the packing carton, while, of course, the separation between guide bars 7, 7a corresponds to the other horizontal dimension of the carton. As subsequently described, those containers and only those, within the rectangle defined by bars 7, 7a, 9, and a line parallel to bar 9, FIGURE 11, passing in tangential relation with and rearwardly of the container in contact with switch 45, are simultaneously picked up at this time, raised as a unit, transported to a position over a carton, lowered into the carton, and then released. As soon as these containers are sufficiently elevated and the conveyor belt resumes movement, the remaining containers accumulated upon the belt, move forwardly into contact with bar 9, about as shown upon FIGURE 7, and are picked up in the next succeeding cycle. Thus this arrangement is obtained perfectly for each operation in the formation of an assembled group or layer of flasks of a size to fit within the carton.

The assembly generally identified at D, comprises a ribbed and reinforced hollow plate 11 shown as rectangular in outline and having its upper surface centrally attached to the rod of a piston vertically movable within a pneumatic cylinder 12 which, in turn, is rigidly attached by through bolts 19 to a slide 18 supported as subsequently described. Plate 11 is hollow and its lower planar face is provided with a plurality of small apertures each so disposed that when the plate is lowered onto a group of flasks assembled as shown upon belt C, each aperture is over and in sealed communication with a respective one of the flasks. The shape of the plate or, rather, the disposition of the apertures therethrough, corresponds with that of the carton or box to be packed, so that when air is exhausted from the interior of the plate and the flasks or bottles, the number and arrangement of the latter constitute one layer of those to be packed. Air is exhausted from and admitted to hollow plate 11 and the flasks, by way of pipes 14 and 16 upstanding from the plate and in communication with the interior thereof. Flexible tubes 15 and 17 are connected with the upper ends of pipes 14 and 16, respectively, and are connected with a source of vacuum, as subsequently described.

Slide 18 to which pneumatic cylinder 12 is fixed and by which it is carried, has opposite parallel sleeves 18a and 18b integral therewith. Each of these sleeves has a smooth fit about a respective one of two horizontal spaced rods 20, 21 parallel with direction x–x′. These rods carry brackets 20a, 21a, etc., which, in turn, are supported by and at the upper ends of respective columns 22 having their lower ends fixed to frame E. At their left ends as viewed upon the figure, rods 20, 21 are interconnected by cross-piece 23. Translation of slide 18 on and along rods 20, 21 is effected by a pneumatic cylinder 24 carried by cradles 25, 26, centrally thereof. These cradles are fixed at their respective ends to rods 20, 21 in a manner clear from inspection of the figure, and serve also to rigidly interconnect the rods. Cylinder 24 has a piston, not shown, with rod projecting through a packing gland closing the contiguous end of the cylinder and, at its end exteriorly of the cylinder, connected with slide 18. By introducing fluid under pressure to one end of the cylinder, while exhausting fluid from the other end thereof, slide 18 and all parts carried thereby are positively and accurately moved and positioned on and along rods 20, 21.

Slide 18 has a rigid extension 27 projecting from one side thereof, horizontally in the direction x–x′. The free end of this extension has a vertical pneumatic cylinder 28 fixed therewith. This cylinder has a piston, not shown, slidably fitting therein and connected with a rod which at its free lower end carries a spider having tubular arms 29 extending radially therefrom in equiangularly-disposed relation. In the apparatus shown there are four of these arms and each carries a suction cup 30 at its distal end. All of these cups are connected with the lower end of a pipe 31 upstanding from extension 27. The pipe is attached at its upper end with a flexible tube 32 leading to a source of vacuum, as subsequently described. The length of extension 27 is such that when slide 18 is at its leftward limiting position on and along rods 20, 21, as the parts are viewed upon the figure, suction cups 30 are located directly over a platform 33a adapted to support a stack 33 of flat sheets of paperboard, cardboard or the like. The sheets are maintained in correct superposed relation by pins 33b fixed at their lower ends in plate 33a and disposed in spaced relation about the periphery of the sheets. The dimensions are such that at the same time platen 11 is disposed over a carton, box or case 40 mounted upon a slide 34 carried by frame E and movable in the direction y–y' suction cup assembly 29, 30 is positioned over stack 33. It is important to note that the assembly D is symmetrical with respect to a vertical plane extending in the direction x–x', and that this plane intersects conveyor belt C midway between guide bars 7, 7a. When slide 18 is at the other limit of its travel, that is, to the right, on and along rods 20, 21, plate 11 is disposed over belt C in vertical registration with an assembled group of flasks ready to be picked up, at the same time that suction cup assembly 30 is over the carton 40.

Slide 34 previously mentioned as being carried upon platform F, is mounted for guided horizontal translation and is connected at 36 with the exterior end of a piston rod 35a. The rod is translated by a piston within a horizontally-disposed cylinder 35 carried by the platform just below the surface thereof, and having its central axis extending in the direction y–y'. A folded carton 37 is shown in dot-dash lines in reserve position on slide 34, with one edge in contact with a collocating abutment or angleiron 39, fixed to the slide. The carton is shown as having the sealing flaps along the upper edges of its side walls, open and ready to receive a first layer of flasks. One flap of this carton is turned downwardly. Due to its emplacement upon the slide, in contact with abutment 39, carton 37 will occupy the position presently occupied by carton 40 being packed when, in translation of slide 34 leftwardly by cylinder 35, the packed carton is moved to position for removal from the slide. It will be noted that laterally-spaced stops or abutments 41, fixed to move with slide 34, engage the trailing wall of the carton being packed, and determine its proper position beneath rods 20, 21. These stops are spring-pressed upwardly into the position shown and are vertically depressable in guideways, to positions substantially coplanar with slide 34. Also as clearly shown, these stops have rearwardly- and downwardly-sloping cam surfaces. When slide 34 is moved leftwardly, packed carton 40 is translated therewith by these stops or latches, to a position for removal for storage or shipment. At the same time, reserve carton 37 is advanced by abutment 39 into the loading position. As the slide is retracted, stops 41 are cammed downwardly by the base of carton 37 and pass beneath it until, when the slide has returned to the position shown, they snap upwardly behind the carton and thereafter hold it accurately in position for packing. A pair of upstanding parallel guide walls 42, 43 are fixed with the frame of the machine, in laterally-spaced relation, and have both ends flared outwardly. The spacing of these walls is the same as the corresponding dimension of the cartons so that, in a way clear from inspection of the figure, the cartons are located and accurately guided into loading position.

Figure 2:
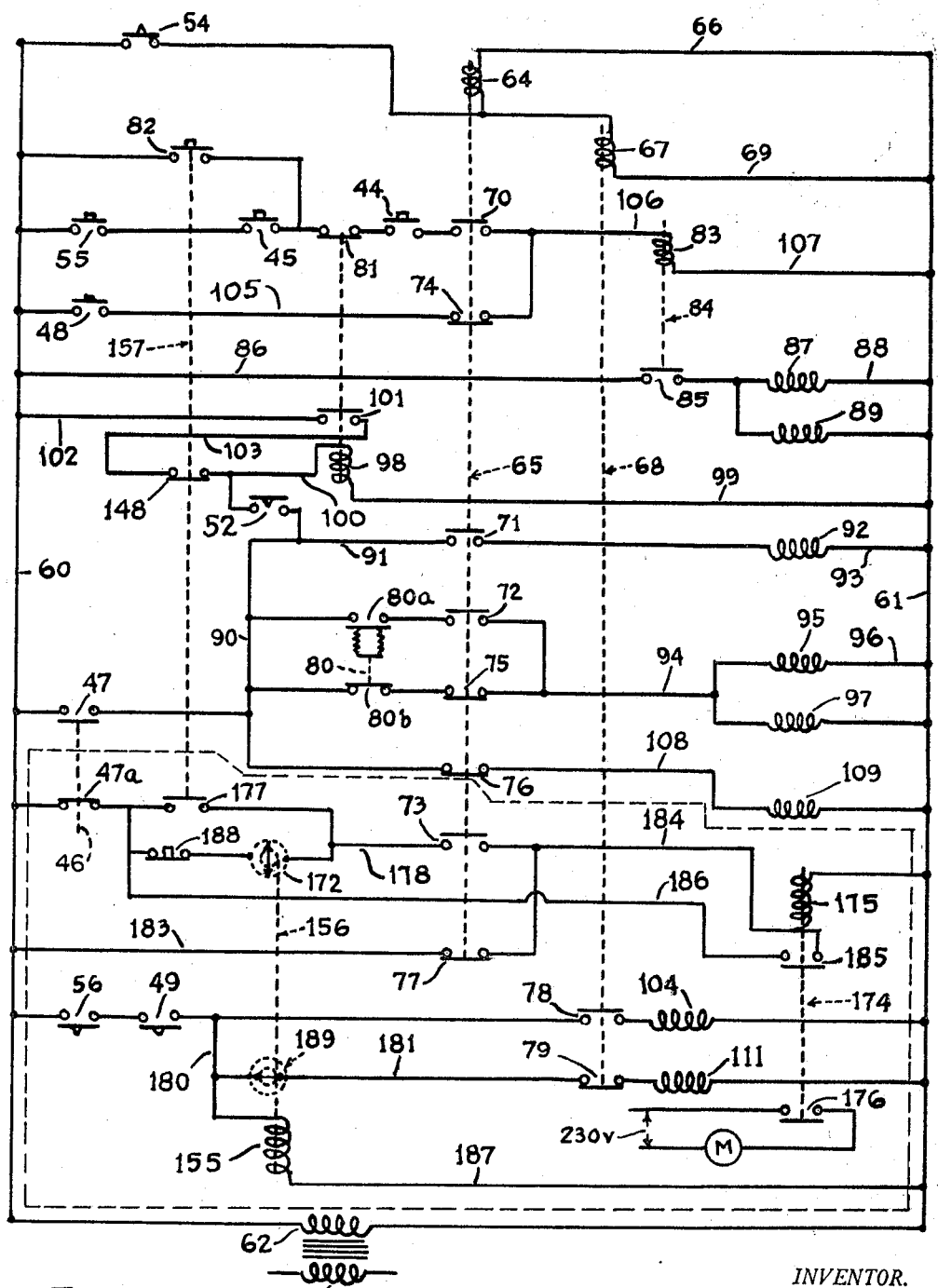
FIGURE 2 is a schematic view of the electrical circuitry for the apparatus of FIGURE 1.

Referring to the wiring diagram of FIGURE 2, main lines 60, 61 are supplied from a suitable source such as the secondary 62 of transformer 63. Starting at the top of this figure, a normally-open switch 54 is maintained closed by assembly D or, more specifically, by slide 18 when the latter is in the rearward position shown upon FIGURE 1. When a master switch not shown, is closed and slide 18 is in the position noted, a circuit is closed which extends from line 60, switch 54, solenoid 64 of relay 65, and lead 66, to line 61. At the same time solenoid 67 of relay 68 is energized over a parallel branch circuit including lead 69.

Energization of relay 65 moves its armature downwardly and closes normallly-open contacts 70, 71, 72 and 73 thereof, while simultaneously opening normally-closed contacts 74, 75, 76 and 77.

Energization of relay 68 moves its armature downwardly to close normally-open contacts 78 thereof and simultaneously to open normally-closed contacts 79.

Relay contacts 70 are in a circuit including in series a first switch 55 appearing upon FIGURE 2a and closed by and in response to accumulation of a first row of flasks on belt C, in contact with bar 9, a second switch 45 also appearing upon FIGURES 1 and 2a, and closed by and in response to accumulation of the final row of flasks upon belt C, as previously explained in connection with FIGURES 10 and 11, a third normally-closed set of relay contacts 81, and a fourth switch 44 also appearing upon FIGURES 1 and 2a, and closed by the weight of a carton in the loading position of item 40. It is noted at this time that switches 45 and 55 are bridged by a branch circuit including a starting switch 82 which enables initiation of operation without the accumulation of a collection of flasks on belt C.

Thus, with belts A and C in operation, flasks 172 advancing into contact with bar 9, slide 18 in retracted position, and an empty carton in position at 40 on slide 34, assembly of a group of flasks as shown upon FIGURE 1, closes switches 45 and 55 and establishes a circuit through solenoid 83 of relay 84. Energization of this relay moves its armature downwardly and momentarily closes normally-open contacts 85. It should be noted that relay 84 is of a type wherein it closes a circuit for a brief period of time, say a second or two, and then releases its armature. Closure of contacts 85 completes a circuit from line 60, lead 86, contacts 85, electromagnet 87, and lead 88 to the other side of the line. At the same time a parallel circuit is completed including electromagnet 89. These two electromagnets, by a construction subsequently described in detail, cause, respectively, the introduction of pressure fluid into the top ends of cylinders 12 and 28, respectively, forcing the pistons therein downwardly. Assuming that the device has been operating for at least one cycle, the lower surface of plate 11 is at this time free and clear, while a sheet of paperboard 33 is held by suction cups 30, over carton 40. See FIGURE 2a.

Plate 11 descends over an assembled group of flasks or bottles, while sheet 33 is simultaneously lowered into the carton. As plate 11 descends into contact with the open tops or necks of the flasks on belt C, normally-open switch 47 carried by a bracket 46 fixed with plate 11 and also appearing upon FIGURE 1, passes between the flasks and is closed by engagement with the belt. Relay contact 71 is closed at this time so that closure of switch 47 completes a circuit traced from line 60, switch 47, leads 90, 91, contacts 71, electromagnet 92 and lead 93 to line 61. Energization of electromagnet 92, in a way subsequently described, operates a valve 132, FIGURES 3 and 5, connecting the interior of hollow plate 11 with a source of vacuum. The lower surface of the plate is, at this time in pressure-tight contact with the open ends or tops of flasks 1; and each aperture therethrough is in registration with a respective one of the flasks, so that all of them are firmly held to the plate. Switch 47 has a second pair of contacts 47a which are normally closed and in series with the relay control circuit of motor M driving belt C. Consequently when plate 11 descends to pick up a group of flasks, this results in opening of contacts 47a and stops the conveyor. At the same time, the vacuum presently effective within cups 30 is broken and the interlayer 33 held by them is released within carton 40.

It is important to note that this stoppage is desirable in order to assure that the containers are motionless while a group thereof is being picked up. At all other times, belt C may continue in motion during operation of the machine.

Figure 3:
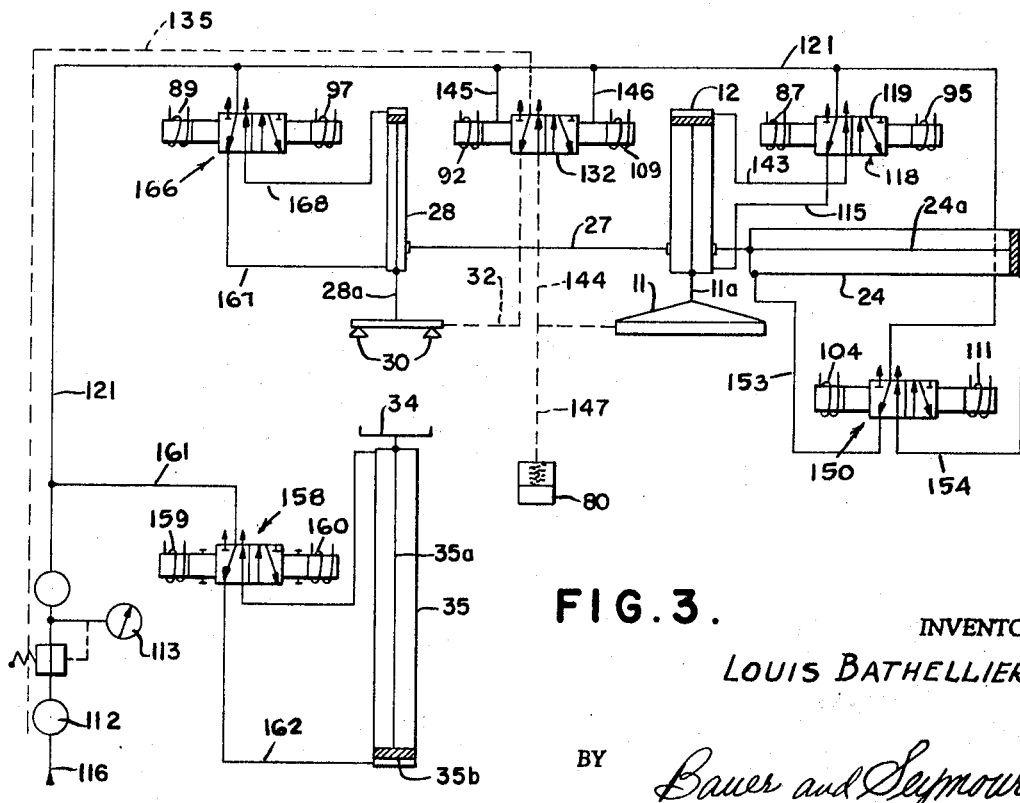
FIGURE 3 is a schematic view of the pneumatic motors, electromagnetic valves, controls and interconnecting piping used in the apparatus of FIGURE 1.

A pressure-responsive switch 80 is associated with the interior of plate 11 by way of pipe 147, FIGURE 3, and has a first pair of normally-open contacts 80a, and a second pair of normally-closed contacts 80b. When the vacuum within plate 11 has attained a predetermined value, switch 80 operates to close its contacts 80a and to open contacts 80b. Closure of contacts 80a completes a circuit from line 60, through presently-closed switch 47, contacts 80a, relay contacts 72, lead 94, electromagnet 95, and lead 96 to line 61. At the same time a parallel branch circuit is closed to energize electromagnet 97. These two electromagnets when energized, operate valves 118 and 166, subsequently described, which introduce fluid under pressure into cylinders 12 and 28, respectively, below the pistons therein, and open the top ends of these cylinders to exhaust. As a result, both pistons rise in unison and plate 11 is elevated with a group of flasks attached thereto. At the same time suction cups 30 are elevated without the interlayer previously held thereby.

Figure 2A:
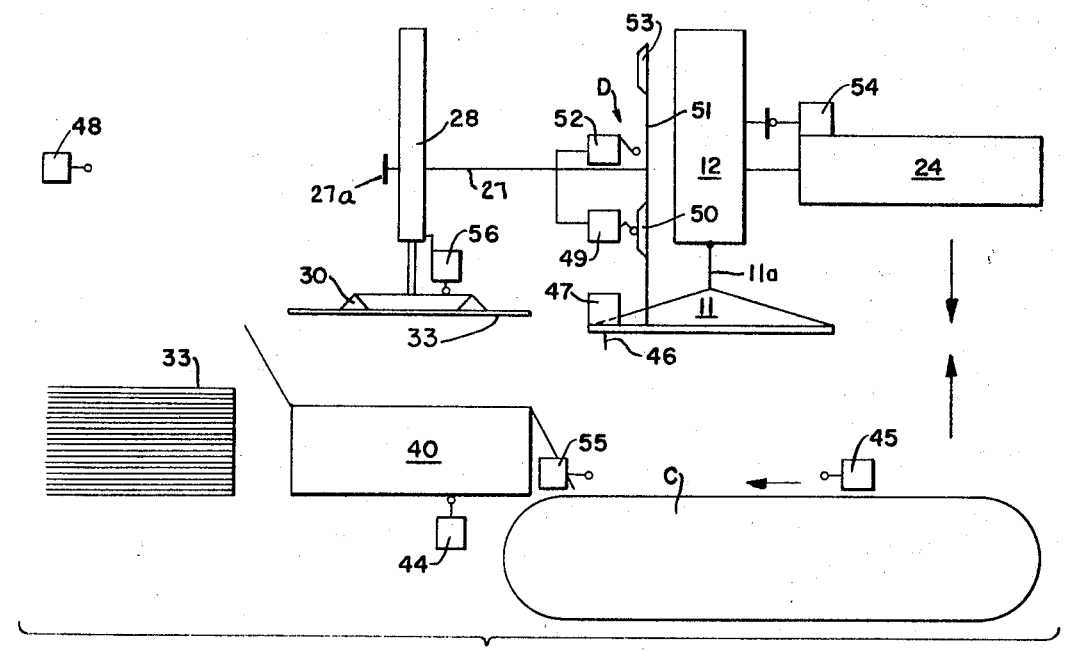
FIGURE 2a is a schematic view showing the locations of the electrical switches in the circuitry of FIGURE 2.

A vertical rod 51, FIGURES 1 and 2a, has its lower end secured to plate 11 and extends upwardly in parallel with cylinder 12. Still refering to FIGURES 1 and 2a, a pair of switches 49 and 52 are mounted on slide 18 in side-by-side relation. Rod 51 has lower and upper triggers 50, 53, respectively, adjustably fixed therewith. Trigger 50 projects laterally from rod 51 in one direction, in position to close switch 49 when plate 11 rises to its upper position. Trigger 53 projects laterally from rod 51 in the other direction, in position to close switch 52 when the plate moves downwardly to pick up a group of containers or flasks. Switch 52 becomes effective only when the final or upper layers of containers is placed in the carton, as subsequently described.

As plate 11 and assembly 29, 30, rise together, a first normally open switch 56 carried by the assembly, is closed at about the same time as closure of switch 49 by abutment 50. Thereby a circuit is closed from line 60, switches 56, 49, relay contacts 78, and electromagnet 104, to the other side of the line. In a way subsequently described, energization of electromagnets 104 actuates valve 150 to admit pressure fluid to the right end of cylinder 24, forcing the piston therein to the left, FIGURES 1, 2a, and 3, and translating slide 18, plate 11 and flasks attached thereto, extension 27, and assembly 29, 30, until the flasks are over carton 40 and assembly 29, 30 is over stack 33. As soon as plate 11 begins to rise, contacts 47 open as this switch moves out of contact with belt C, while contacts 47a thereof close. At the instant that slide 18 begins leftward travel, switch 54 opens and relay coils 64 and 67 are de-energized. De-energization of relay 65 opens contacts 70, 71, 72, and 73, and closes contacts 74, 75, 76 and 77. De-energization of relay 68 opens contacts 78 and closes contacts 79.

As slide 18 moves into correct leftwardmost position on and along rods 20, 21, it engages and closes a switch 48, also appearing upon FIGURES 1 and 2a, and shown as carried by the cradle connecting rods 20 and 21. A circuit is thereby closed from line 60, switch 48, lead 105, relay contacts 74, lead 106, the solenoid 83 of relay 84, and lead 107, to line 61. Energization of relay 84 again momentarily closes contacts 85 and thus energizes electromagnets 87 and 89, as previously described, to actuate valves 118 and 166, FIGURE 3, to introduce pressure fluid into cylinders 12 and 28, respectively, thus forcing the pistons thereof downwardly. Plate 11 thus descends into carton 40 and as switch 47 carried thereby, contacts the interlayer 33 just previously emplaced in the carton, this switch is again closed and a circuit is completed through lead 90, relay contacts 76, lead 108, and electromagnet 109. Energization of 109 operates valve 132 to release suction in plate 11, so that the flasks previously attached thereto are deposited in orderly arrangement upon the previously-positioned interlayer 33. At the same time, the valve 132 controlled by this electromagnet connects arms 29 and suction cups 30 to the source of vacuum. On release of vacuum in plate 11, switch 80 responds by opening its contacts 80a and closing those those at 80b thus again energizing electromagnets 95 and 97 by way of contacts 80b, relay contacts 75, lead 94, etc., causing elevation of the assembly with an interlayer sheet held by suction cups 30.

As plate 11 and its attached rod 51 rise, abutment 50 closes switch 49, while rise of assembly 29, 30 closes switch 56. These switches thus establish a circuit traced from them to lead 180, relay contacts 189, lead 181, relay contacts 79 and electromagnet 111 which, when energized, operates valve 150, FIGURE 3, to effect the introduction of pressure fluid into the left hand end of cylinder 24, and the exhaust of fluid from the right hand end, thus returning assembly 11, 18, 27, 29, 30, etc., to the limiting position to the right, shown upon FIGURE 1. As the assembly moves into final position to the right, cylinder 12 engages and closes switch 54 and a new cycle is initiated by the energization of relay solenoids 64 and 67, provided the layer of containers just deposited into the carton 40 is not the final or top one.

Abutment 53, previously mentioned, is independently adjustable on and along rod 51 and locked in position in accordance with the desired number of layers of containers in each carton or, alternatively, the number of layers required to fill the carton. Switch 50 is operated at each descent of plate 11, but since it is connected in series with switch 47, its circuit is closed only in response to descent of the plate to deposit the top or final layer of containers into the carton. In other words, switches 47 and 52 are operated at one and the same time only when plate 11 descends into the carton to deposit the final or top layer of containers therein. When the final layer for that carton is deposited, a circuit is completed from switch 47, lead 90, switch 52, lead 100, solenoid 98 and lead 99. Energization of relay solenoid 98 draws down its armature and closes contacts 101 to establish a holding circuit by way of lead 102, contacts 101, lead 103, contacts 148, solenoid 98, etc. At the same time, relay contacts 81 are opened, thus preventing energization of relay solenoid 83 as long as relay solenoid 98 remains energized.

A switch, not shown, is momentarily closed manually or automatically, to energize electromagnet 159 of valve 158. This valve, as seen from FIGURE 3, controls the admission of pressure fluid to the right hand end of cylinder 35 as viewed upon FIGURE 1. The piston of this cylinder then moves slide 34 to the left and positions the packed carton for removal while at the same time moving empty carton 37 into loading position. After removal of the packed carton, a second switch, not shown, is momentarily closed to energize electromagnet 160 of valve 158, thus effecting return of slide 34 to the position shown. Since the empty carton is maintained in loading position it cams abutments 41 downwardly until these ride upwardly free of the carton to return the parts to the positions shown.

To initiate the filling of a new carton, switch 82 is manually closed. The operating means of this switch is also connected, as indicated at 157, with normally-closed switch contacts 148. When contacts 148 are thus manually opened, the holding circuit for relay solenoid 98 is broken and contacts 101 thereof open while contacts 81 close. Since closure of switch 82 by-passes switches 45 and 55, switch 44 being closed by the carton in loading position, solenoid 83 of relay 84 is again closed and a new cycle begins. Of course this new cycle is not initiated until a full layer of flasks has been accumulated on belt C.

Motor M, FIGURE 2, driving conveyor belt C, is under control of relay 174 having a solenoid 175. Assuming at the outset that slide 18 and parts carried thereby are in the rightwardmost position wherein switch 54 is closed, and plate 11 is elevated, solenoid 64 of relay 65 is energized and contacts 73 are thereby closed. Manual closing of switch 82 also acts through connection 157 to close contacts 177. This completes a circuit traced from line 60, presently closed contacts 47a, contacts 177, lead 178, presently closed relay contacts 73, lead 184, and solenoid 175 to line 61. Energization of solenoid 175 draws the armature of relay 174 upwardly and closes contacts 176 to complete a high-voltage circuit through motor M to thus effect movement of conveyor C. At the same time, energization of solenoid 175 closes a second pair of contacts 185 to establish a holding circuit by way of switch 47a, lead 186, contacts 185, and solenoid 175, so that the motor remains in operation when switch button 82 is released.

When plate 11 descends and carries with it switch 47, 47a, the depending plunger 46 of this switch engages the conveyor belt and, as previously explained, opens contacts 47a and closes contacts 47. Opening of contacts 47a opens the circuit of motor relay solenoid 175, motor contacts 176 open and the motor and conveyor stop while a group of containers assembled on the conveyor are being attached by suction to the plate.

As soon as plate 11 with its attached accumulation of containers starts to rise in response to energization of valve solenoid 95, on closure of contacts 80a, contacts 47 again open and contacts 47a close. However, closure of contacts 47a does not now start motor M because contacts 177 are open. When the plate and suction cup assemblies arrive at fully elevated position, they close switches 49 and 56 substantially simultaneously. This completes a circuit traced from line 60, presently closed switches 56, 49, lead 180, solenoid 155 of relay 156, and lead 187 to line 61. Energization of solenoid 155 closes relay contacts 172 and thus completes a circuit from switch 47a, normally closed manual safety switch 188, contacts 172, presently closed relay contacts 73, and lead 184, to motor control solenoid 175, etc. At the same time, closure of switches 49 and 56 effects energization of valve solenoid 104 and starts the assembly of slide 18, plate 11, etc., with attached containers, leftwardly, as previously explained.

Relay 156 is of a known type similar to the ordinary pull-chain lamp bulb switch except that it includes two relatively insulated rotary contacts 172 and 189. As depicted upon FIGURE 2, contacts 172 are open and contacts 189 are closed. When, in response to energization of solenoid 155, its armature is drawn downwardly, each of the contacts is rotated 180° to thereby close contacts 172 and open contacts 189. The connection between the armature of the relay and the rotary contacts includes a ratchet and pawl mechanism like the ordinary pull-chain lamp bulb socket switch, so that when solenoid 155 is de-energized, the armature rises under urge of a spring not shown, while the rotary contacts remain in the closed or open positions to which they were moved by the immediately previous energization of the solenoid. Thus, opening of contacts 189 prevents energization of valve solenoid 111 at this time.

When slide 18 starts leftward travel, switch 54 is thereby opened and relay solenoid 64 is de-energized to simultaneously close contacts 77 and open contacts 73 as previously described. Thus, despite opening of contacts 73, motor M continues to operate due to the fact that its relay circuit remains closed by way of lead 183, contacts 77, lead 184, etc.

When the slide assembly arrives at its leftwardmost position under control of valve 150 and the piston in cylinder 24, it engages and closes switch 48 thus again energizing valve solenoids 87, 89, and causing plate 11 and its attached containers to descend into the carton being loaded, while suction cup assembly 30 descends into contact with the upper one of the stack of interlayers 33. The containers are deposited as previously described and closure of switch 47 effects energization of valve solenoids 95 and 97, to cause the plate to rise without the containers, while suction cups 30 simultaneously rise with an interlayer attached. As the assembly 11, 30, etc., rises to its upper limiting position and closes switch contacts 49, 56, relay solenoid 155 is again energized to rotate contacts 172 and 189 through a second 180° step. This opens contacts 172 and closes contacts 189. Opening of contacts 172 has no effect upon motor M at this time, because its relay solenoid 175 is energized through presently closed relay contacts 77.

Closure of contacts 189, however, completes a circuit traced through switches 56, 49, leads 180, 181, presently closed relay contacts 79, and solenoid 111 of valve 150. This actuates the valve to cause movement of piston in cylinder 24 to the right. Thus motor M drives conveyor belt C continuously from the time slide 18 is in its rightwardmost position shown upon FIGURE 1, and the plate assembly rises with its attached containers and closes switches 49, 56, until the plate assembly returns from its leftward travel and closes switch 54. A new cycle is then initiated by manual closure of switch 82.

Figure 4:
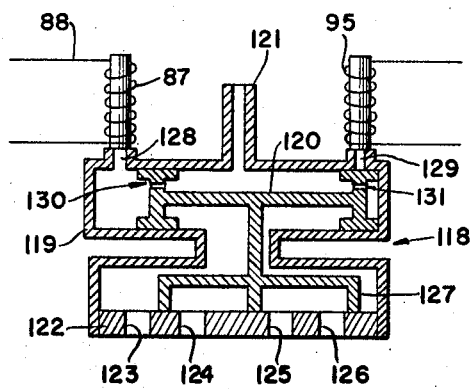
FIGURE 4 is a schematic sectional view of one of the four duplicate electromagnetic valves controlling the admission of pressure fluid to the motor cylinders.

FIGURE 4 shows one of the four duplicate electromagnetic valves embodied in the apparatus, namely, one for each of cylinders 12, 24, 28, and 35. For definitiveness this valve will be described in connection with cylinder 12, it being understood that the other three operate in an identical way each in connection with its respective cylinder 24, 28, and 35.

The valve generally identified at 118 comprises a cylinder 119 having a double piston unit 120 therein and movable from a first limiting position shown at the right, to a corresponding second limiting position at the left. A pipe 121 is connected with a source of fluid such as air under pressure. The valve body includes a plate 122 having therein regularly spaced orifices 123, 124, 125, and 126. A valve slide 127 is connected with piston unit 120 and has depending walls which slide over and in pressure-tight relation with the orifices, when piston 120 moves between its limiting position described. At one end cylinder 119 has an orifice 128 normally obturated by the armature of electromagnet 87 previously described in connection with FIGURE 2. At its other end the cylinder is provided with an orifice normally closed by the armature of electromagnet 95, also previously described. Each piston of item 120 has a small bleeder hole therein such as 130 for the left piston of unit 120, and 131 for the right piston thereof. When the piston is in either of its limiting positions it acts to obturate the valve orifice in the cylinder at that end. Orifice 123 is connected as subsequently described, with the bottom end of cylinder 12 and orifice 126 with the top end thereof. Orifices 124 and 125 are connected with atmosphere.

When electromagnet 87 is energized by closure of relay contacts 85, its armature moves to open orifice 128, thus reducing the pressure in the left end of cylinder 119. Piston unit 120 is thus driven immediately to its extreme leftward position by pressure from pipe 121. Slide 127 is correspondingly moved to open orifice 126 to full pressure from pipe 121, while orifice 123 is connected to atmosphere through orifice 124. The piston in cylinder 12 is thus moved downwardly together with plate 11, etc., as previously described. Of course, at the same time, electromagnet 89, FIGURES 2 and 3, is energized and in a like way controls its valve 166 to effect descent of the piston in cylinder 28.

On the other hand, when electromagnet 95 is energized in the manner previously described, its armature opens orifice 129. Orifice 128 is closed at this time. The resulting pressure drop in the right hand end of cylinder 119 causes piston unit 120 to move to the position shown upon FIGURE 4. Air under pressure now passes from pipe 121 through orifice 123 to the lower end of cylinder 12 thus causing the piston therein to rise and carry with it plate 11 and flasks held thereto by vacuum. Simultaneously air exhauts from the top end of the cylinder through orifices 126, 125, to atmosphere.

Due to bleeder holes 130, 131 in the pistons of unit 120, the pressure is normally essentially the same at all points in cylinder 119, that is, when both electromagnets are de-energized. This pressure acts against the two electromagnetic valves and assists in opening them when either electromagnet is energized. The valves may be spring-urged into closed positions.

Figure 5:
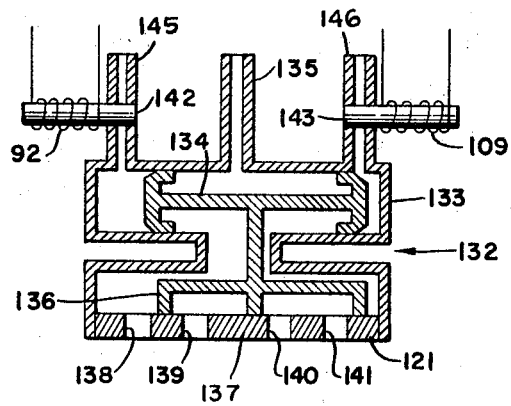
FIGURE 5 is a schematic sectional view of the valve connecting the lifting platen and suction cups for interlayer sheets, with a source of vacuum.

FIGURE 5 shows the valve by which the hollow interior of plate 11 and vacuum cup assembly 30 are connected with and cut off from a source of vacuum. A valve body 132 includes a cylinder 133 having double piston unit 134 slidable therein. A source of vacuum is connected with pipe 135 extending centrally from the cylinder. The piston unit includes a valve element 136 sliding over a plate 137 having therein valve orifices 138, 139, 140, and 141. Orifice 138 is connected by pipe 144, FIGURE 3, with the interior of plate 11, while orifice 141 is connected by pipe 31 by way of flexible tube 32, FIGURES 1 and 3. At its left end, cylinder 133 has a valve orifice 142 normally closed by the armature unit of electromagnet 92. A like orifice 143 at the other end of the cylinder, is normally closed by the armature unit of electromagnet 109. Both electromagnets have been previously described in connection with FIGURE 2. Valve 142 is supplied over branch pipe 145, with pressure fluid from pipe 121. Similarly, valve 143 is supplied by branch pipe 146. Due to these connections, opening of either valve 142 or 143 effects rapid response of piston unit 134.

When electromagnet 92 is energized and tis valve opens to pipe 121, piston 134 is forced to the right and valve element 136 is correspondingly moved to the position shown upon FIGURE 5, to connect orifice 138 with vacuum pipe 135. This is the condition wherein plate 11 is lowered into contact with the mouths of an assembled group of flasks on belt C. At the same time the interior of suction cups 30 is opened to atmosphere through orifices 141, 140, so that the interlayer sheet 33 previously held thereto is released and deposited into the carton being packed.

On the other hand, when electromagnet 109 is energized to open valve orifice 143, pressure from pipe 121 admitted to the right end of cylinder 133 forces piston 134 to the left limiting position wherein orifice 141 is connected with source pipe 135 and vacuum is developed within cups 30, while the interior of platen 11 is open to atmosphere by way of orifices 138, 139. It is to be noted that the response of piston unit 134 to opening of either valve 142 or 143, is practically instantaneous, so that relay solenoid 83 is required to be energized only momentarily. In the condition just described, slide 18 is over carton 40 and plate 11 has been lowered with its group of flasks, onto the bottom of the carton or onto the layer of flasks previously deposited therein. At the same time suction cups 30 have been lowered into contact with the top sheet of stack 33. Thus but one valve such as that shown in FIGURE 5, is required for each machine.

FIGURE 3 shows schematically the arrangement and relation of the parts. In the figure, pressure lines are shown solid and vacuum lines are dotted. 116 indicates a source of air or other fluid under pressure, with regulator 112 and gauge 113. Pipe 121 extends to cylinder 119. Pipe 115 extends from orifice 123, FIGURE 4, to the lower end of cylinder 12, and pipe 143 extends from port 126 to the top end of this cylinder. Valve 166 controlling cylinder 28 is connected with pressure pipe 121, as shown. Branch pipes 167, 168 connect this valve with the lower and upper ends, respectively, of the cylinder in the same way as has been described for valve 118. A valve 150 which may be identical with valve 118, controls cylinder 24. Pipe 121 extends to the central admission port of this valve and branches 153, 154 connect the outlet ports of the valve to the right and left ends of the cylinder, respectively. Electromagnets 104 and 111, previously described, are embodied in this valve, as indicated.

Valve 132, FIGURES 3 and 5, has electromagnets 92 and 109 embodied therein. Its main port is connected with suction line 135. Valve port 138 is connected with pipe 32 in communication with cups 30. Port 141 is connected by pipe 144 with the interior of platen 11. Ports 139, 140 are connected to exhaust. A branch pipe 147 extends from pipe 144 to pressure-responsive switch 80, previously described in connection with FIGURE 2. FIGURE 2a shows schematically the disposition and arrangement of the several switches. All of these have been previously described. It is noted that switch 48 is disposed so as to be engaged and closed by a part 27a of extension 27, when slide 18 and parts carried thereby are at their leftward limiting position to deposit a layer of containers within the carton and to pick up a sheet from stack 33.

I have thus provided a method and apparatus which fulfill all of the objects and purposes of the invention. The apparatus is substantially fully automatic and operates with a minimum of attention to assemble layers of containers in predetermined number and arrangement such that each layer accurately fits within a carton, to conduct each layer in sequence, as assembled, to a position within the carton to be packed, to release the containers of a layer within the carton in an orderly manner and without disturbing their arrangement, and to return the carton-loading means to position for attachment to a second layer. At the same time, an interlayer or sheet to be emplaced upon the layer of containers just packed, is moved to position over the carton and deposited upon the layer simultaneously with collection of the second layer from the conveyor. Each group of containers is assembled on the conveyor while the preceding group is being packed, so that the operation is continuous, efficient and cost-reducing. When the final layer is emplaced in the carton, the apparatus stops with the parts ready to descend for collection of the first layer of containers for the next carton to be loaded; and a new cycle can be initiated merely by pressing of a switch button.

Furthermore, it is contemplated that the aforesaid manual closer of switch 82, etc., can be performed automatically. For example, the circuit including switch 52, which circuit is closed only by and in response to deposit of the top layer in a carton, can also be arranged to energize a time-delay relay which, at the end of a period of time sufficient for slide 18 and platen 11 to return to the positon of FIGURE 1, operates to close switch 82, etc., and its associated parts, and then release.

FIGURES 6 to 11 are diagrams illustrating the operation of the apparatus.

The downstream or abutment end of frame 7 is provided with recesses 170 between projecting abutments 171 having rounded faces calculated to shunt the flasks 172 into the recesses. The flasks move toward the frame in alignment with the central abutment and are shunted aside, as shown in FIGURES 6, 7, 8 and 9, by the triangular shape of the accumulating mass of flasks. The recesses and abutments are of sizes related to the sizes of the flasks, as illustrated in FIGURE 8.

A switch 55, as shown in FIGURES 2 and 10 is engaged and thrown by one of the first flasks, controlling the apparatus as aforesaid, during the filling of the frame. When the frame has been filled one the last flasks engages and throws the switch 45, which projects through or above one of the guides 173, controlling the next phase of the operation as described elsewhere herein.

Numerous other modifications and substitutions of equivalents will readily occur to those skilled in the art, after a study of the foregoing disclosure. Hence the disclosure is to be taken in an ilustrative rather than a limiting sense; and all modifications, alterations, re-arrangements and substitutions within the scope of the subjoined claims, are reserved.

Having now fully disclosed the invention, wat I claim and desire to secure by Letters Patent of the United States is:

1. In an apparatus for packing cartons each with a plurality of discrete containers, a conveyor having a horizontal upper pass moving in a first direction, means associated with the receiving end of said pass to deposit on said pass, centrally thereof, containers forming a single file extending in said direction, a fixed abutment bar extending over and transversely across said pass adjacent the delivery end thereof, first and second fixed guide bars over said pass and extending toward the receiving end of said pass, from respective ends of said abutment bar, a slide, means mounting said slide for guided translation between a first position superposed over the delivery end of said pass, and a second position horizontally to one side thereof, platen means carried by said slide for vertical translation with respect thereto, from a first lower position contiguous to said pass, to a second elevated position, first power means connected with said platen to move the same between its said first and second positions, and means responsive to accumulation on said pass, of a predetermined number of complete transverse rows of containers counting from the first row in contact with said abutment bar, and each extending from one said guide bar to the other, to effect releasable attachment of all said containers as a unit to said platen when said slide and platen means are in their said first positions.

2. The apparatus of claim 1, said last-named means comprising a first switch adjacent one said guide bar, said switch being closed by and in response to positioning of the end container adjacent said one guide bar, of the final one of said predetermined number of transverse rows, and circuit means including said first switch and responsive to closure thereof, to elevate said platen means and containers to second position.

3. The apparatus of claim 2, said circuit means also including a second switch positioned adjacent said abutment bar and closed by and in response to movement into contact with said abutment bar, of a preselected one of the containers of the first of said rows, said circuit means connecting said first and second switches in series.

4. The apparatus of claim 3, a relay havng a normally-closed contact in series with said first and second switches, and a solenoid, a third normally-closed switch fixed with said slide and in series with said solenoid, and switch operating means connected with said platen means for movement therewith, said switch operating means actuating and closing said third switch at a preselected point in travel of said platen means relatively to said slide, thereby energizing said solenoid and opening said relay contact, said switch operating means being vertically adjustable with respect to said platen means.

References Cited
UNITED STATES PATENTS

| | | | |
|---|---|---|---|
| 2,524,846 | 10/1950 | Socke et al. | 53—247 X |
| 2,535,880 | 12/1950 | Tomkins | 53—146 X |
| 2,666,562 | 1/1954 | Birch | 53—247 |
| 2,904,944 | 9/1959 | Notredame et al. | 53—61 |
| 2,918,766 | 12/1959 | Rogier et al. | 53—249 X |

TRAVIS A. McGEHEE, *Primary Examiner.*

ROBERT L. FARRIS, *Assistant Examiner.*

U.S. Cl. X.R.

053—157, 165, 247